United States Patent
Tracy et al.

(10) Patent No.: US 7,841,632 B2
(45) Date of Patent: Nov. 30, 2010

(54) ELECTRONIC DEVICE LATCH DAMPENING SYSTEM

(75) Inventors: Mark S. Tracy, Tomball, TX (US);
Steven S. Homer, Tomball, TX (US);
Dan V. Forlenza, Houston, TX (US);
Earl W. Moore, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 295 days.

(21) Appl. No.: 11/700,203

(22) Filed: Jan. 30, 2007

(65) Prior Publication Data

US 2008/0179150 A1 Jul. 31, 2008

(51) Int. Cl.
*E05C 1/08* (2006.01)
*E05C 19/10* (2006.01)

(52) U.S. Cl. .............. 292/163; 292/121; 292/DIG. 56; 292/DIG. 61; 292/DIG. 73

(58) Field of Classification Search ............ 292/32, 292/121, 137, 146, 147, 150, 163, DIG. 4, 292/DIG. 38, DIG. 56, DIG. 61, DIG. 63, 292/DIG. 73; 361/681, 683
See application file for complete search history.

(56) References Cited

U.S. PATENT DOCUMENTS

| | | | | |
|---|---|---|---|---|
| 4,470,624 A * | 9/1984 | Bisbing | ................... | 292/169 |
| 5,082,317 A * | 1/1992 | Delaney, Jr. | ............. | 292/251.5 |
| 5,961,164 A * | 10/1999 | Gomi | ................... | 292/216 |
| 6,019,400 A * | 2/2000 | Prevot et al. | ............. | 292/145 |
| 6,115,239 A * | 9/2000 | Kim | ................... | 361/681 |
| 6,129,395 A | 10/2000 | Schlesener | | |
| 6,241,294 B1 * | 6/2001 | Young et al. | ............. | 292/336.3 |
| 6,256,194 B1 | 7/2001 | Choi | | |
| 6,499,775 B2 * | 12/2002 | Fujiwara | ................... | 292/143 |
| 6,517,129 B1 | 2/2003 | Chien | | |
| 6,570,757 B2 * | 5/2003 | DiFonzo et al. | ............. | 361/683 |
| 6,659,516 B2 | 12/2003 | Wang | | |
| 6,870,740 B2 | 3/2005 | Hsu | | |
| 6,890,008 B1 | 5/2005 | Chuang | | |
| 6,927,972 B1 | 8/2005 | Wang | | |
| 2001/0030429 A1 | 10/2001 | Yen | | |
| 2006/0170223 A1 * | 8/2006 | Homer et al. | ............. | 292/102 |

* cited by examiner

*Primary Examiner*—Carlos Lugo

(57) ABSTRACT

An electronic device comprising a latch mechanism configured to securely fasten a first member to a second member and a dampening system configured to reduce acoustical noise generated in response to actuation of the latch mechanism.

9 Claims, 4 Drawing Sheets

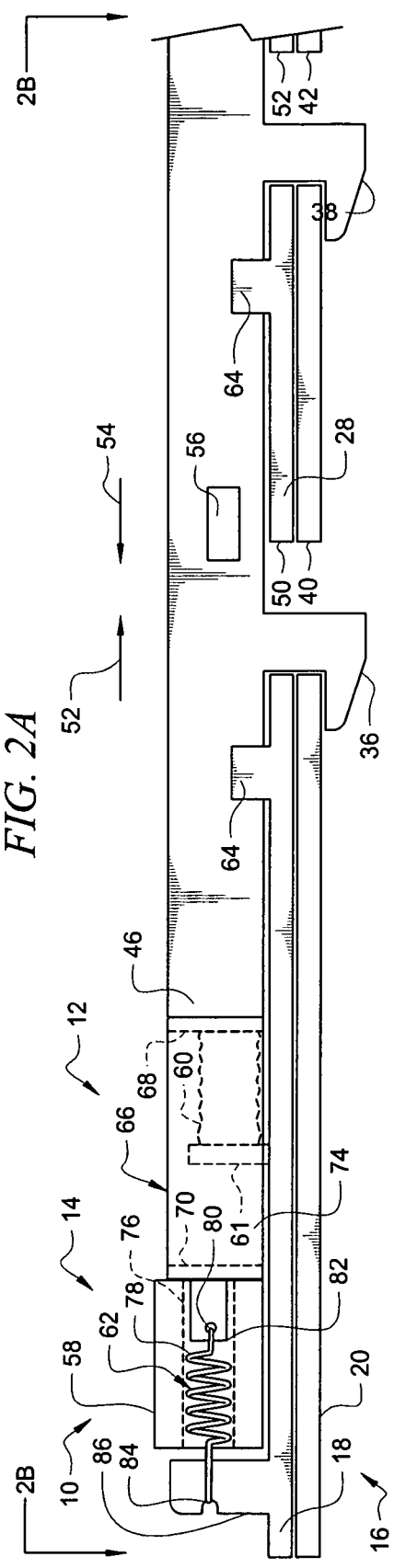
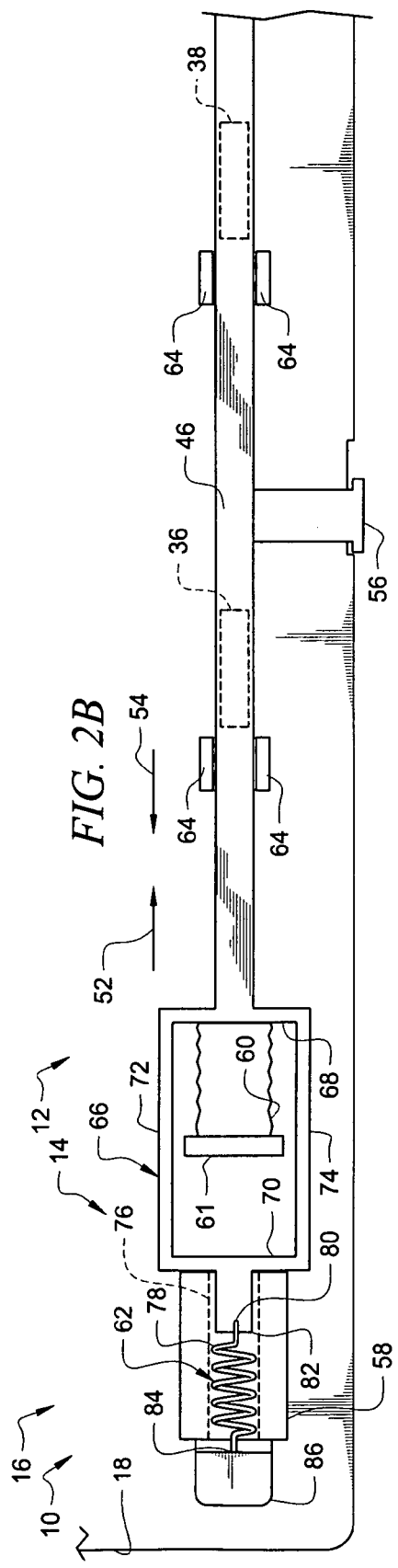
FIG. 2A
FIG. 2B

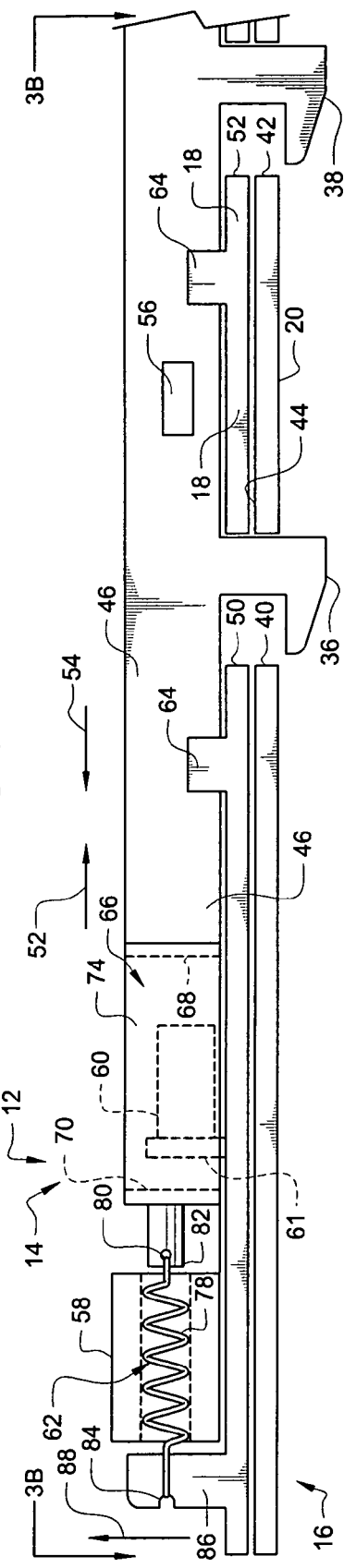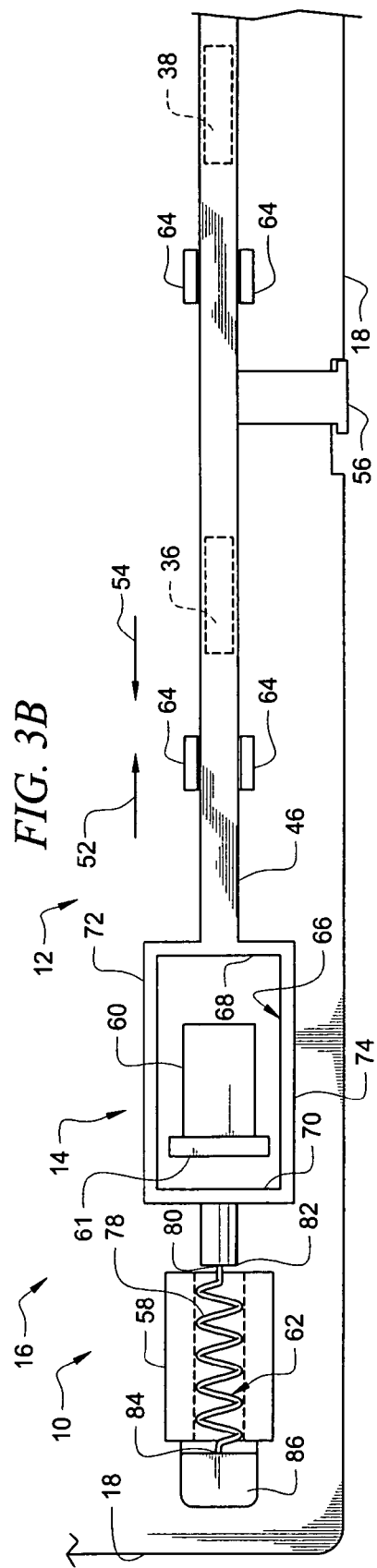

ELECTRONIC DEVICE LATCH DAMPENING SYSTEM

BACKGROUND

Electronic computing devices, such as laptop or notebook computers, comprise latch mechanisms to securely fasten a computer's display member in a locked position relative to its base member. For example, laptop computers comprise latch mechanisms having spring-biased hooks insertable within corresponding openings to secure the laptop computer in the locked position. However, when such latch mechanisms are actuated (e.g., transitioned between a locked and unlocked position), the moving parts within the latch mechanism (e.g., springs, sliders, etc.) tend to rattle and generate excessive and unwanted acoustical noise.

BRIEF DESCRIPTION OF THE DRAWINGS

FIG. 2a is diagram of a side view of the dampening system of FIG. 1 in a locked position;

FIG. 2b is a diagram of a top view of the dampening system of FIG. 2a in a locked position;

FIG. 3a is a diagram of a side view of the noise dampening system of FIG. 1 in a locked position;

FIG. 3b is a top view of the dampening system of FIG. 1 in an unlocked position;

DETAILED DESCRIPTION OF THE DRAWINGS

The preferred embodiments and the advantages thereof are best understood by referring to FIGS. 1-5, like numerals being used for like and corresponding parts of the various drawings.

Figure 1:
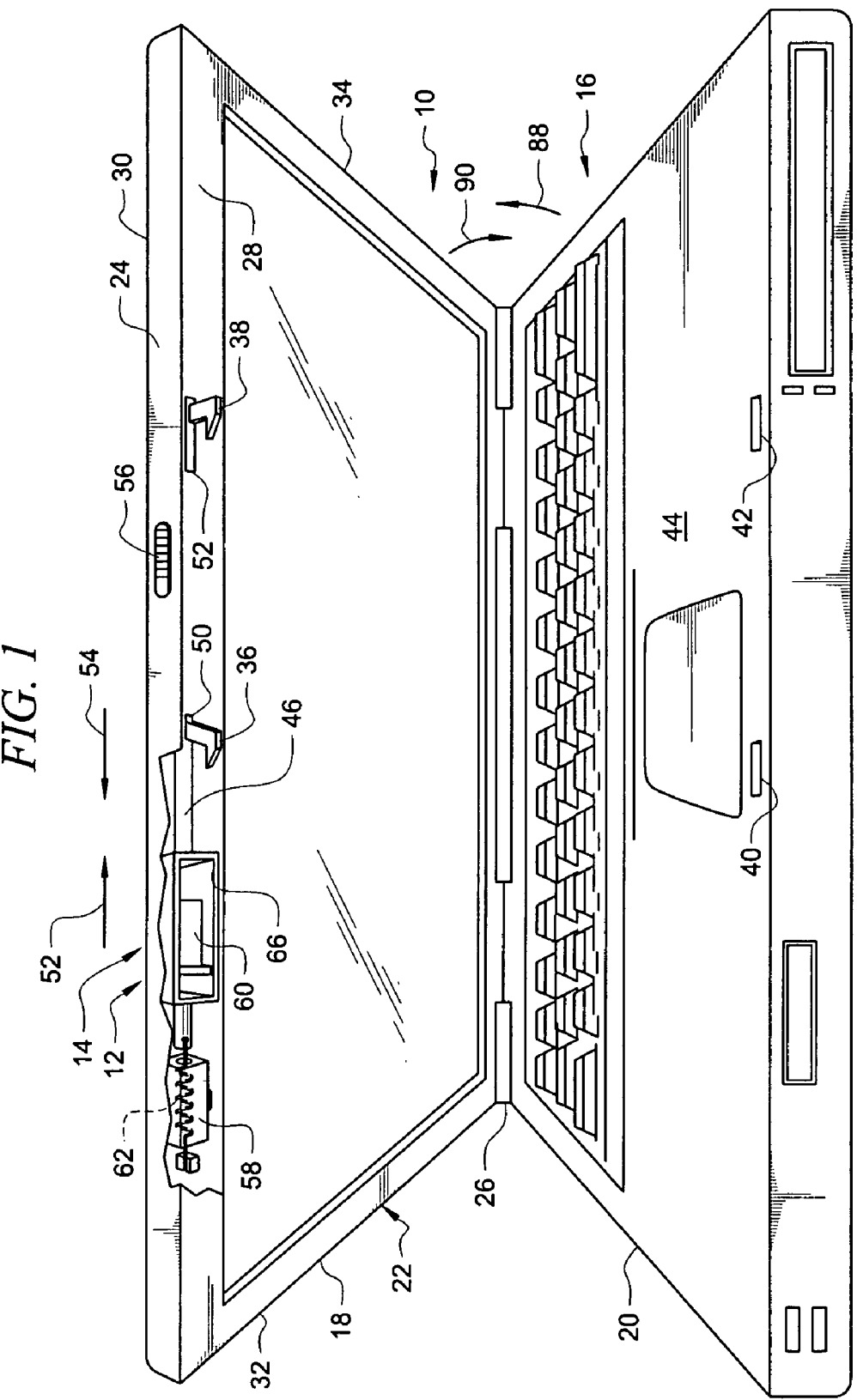
FIG. 1 is a diagram illustrating an electronic device having a latch mechanism in which a dampening system is employed to advantage.

FIG. 1 is a diagram of an electronic device 10 comprising a latch mechanism 12 in which a dampening system 14 is employed to advantage. In the embodiment illustrated in FIG. 1, electronic device 10 comprises a laptop or notebook computer 16; however, it should be understood that electronic device 10 may comprise any type of electronic device such as, but not limited to, a convertible tablet personal computer, a personal digital assistant, or any other type of portable or non-portable electronic device having and/or utilizing a latch mechanism. In the embodiment illustrated in FIG. 1, electronic device 10 comprises a display member 18 rotatably coupled to a base member 20. Display member 18 comprises a housing 22 having a top wall 24, a bottom wall 26, a front wall/bezel 28, a rear wall 30 and a pair of sidewalls 32 and 34.

In the embodiment illustrated in FIG. 1, latch mechanism 12 comprises hooks 36 and 38 extending outwardly from display member 18 and insertable within a pair of corresponding openings 40 and 42, respectively, to secure display member 18 and base member 20 in a locked position (e.g., positioned such that display member 18 is adjacent to and otherwise covers a working surface 44 of base member 18). While hooks 36 and 38 are illustrated extending outwardly from display member 18 for insertion within base member 20 openings 40 and 42, it should be understood that hooks 36 and 38 may be disposed within and extend outwardly from base member 18 to cooperate with a pair of corresponding openings 40 and 42 within display member 18. Furthermore, it should be understood that a greater or fewer number of hooks 36/38 and corresponding openings 40/42 may be utilized secure display member 18 and base member 20 in a locked position. In operation, latch mechanism 12 is actuatable to orient/position hooks 36 and 38 between a locked position (e.g., to secure display member in the locked position) and an unlocked position (to enable display member to be moved away from the base member 20 into an open position). Dampening system 14 reduces and/or substantially eliminates acoustical noise generated in response to actuation of latch mechanism 12 between the locked and unlocked positions.

In the embodiment illustrated in FIG. 1, latch mechanism 12 comprises a latch slider 46 configured to enable slideable movement of hooks 36 and 38 relative to corresponding display member openings 50 and 52, respectively. Latch mechanism 12 further comprises a biasing mechanism 62 to urge latch slider 46 in the direction of arrow 54 to the locked position. In operation, latch slider 46 is movable in the direction of arrows 52 and 54 to position latch mechanism 12 in the unlocked and locked positions, respectively. For example, latch mechanism 12 is manually actuated in response to movement of a switch 56 by a user in the direction of arrow 52 to facilitate movement of latch slider 46 (and thus hooks 36 and 38). Movement of switch 56 in the direction of arrow 52 configures latch mechanism 12 in the unlocked position, as illustrated in FIG. 1 (e.g., such that hooks 36 and 38 are aligned within openings 40 and 42, respectively, for insertion into or removal therefrom). Upon release of switch 56, biasing mechanism 62 automatically retracts latch slider 46 (and thus hooks 36 and 38) in the direction of arrow 54 in the locked position.

In the embodiment illustrated in FIG. 1, dampening system 14 comprises a latch stop 60 disposed within a framed opening 66 of latch slider 46 and a biasing mechanism dampener 58 for reducing and/or substantially eliminating acoustical noise generated by actuation of latch mechanism 12. In the embodiment illustrated in FIG. 1, dampener 58 comprises an rubber material and is configured to receive and/or be disposed around at least a portion of biasing mechanism 62 to absorb and/or otherwise reduce vibrations, and thus resulting noise, generated by biasing mechanism 62 in response to actuation of latch mechanism 12. For example, actuation of latch mechanism 12 via switch 56 causes biasing mechanism 62 to be in an extended position such that when switch 56 is released, biasing mechanism 62 automatically returns latch slider 46 in the direction of arrow 54 to its locked position. As biasing mechanism 62 urges latch slider in the direction of arrow 54 toward the locked position, latch stop 60 engages latch slider 46 to decelerate movement of latch slider 46, thereby preventing and/or substantially reducing high-speed impact and excessive noise as latch slider 46 transitions to the locked position. Furthermore, dampener 58 simultaneously acts to reduce and/or absorb vibrations generated by biasing mechanism 62 and also stops latch slider 46 as latch slider 46 contacts and/or otherwise abuts the end of dampener 58.

FIG. 2a is a diagram illustrating a side view top view of dampening system 14 of FIG. 1 in a locked position, and FIG. 2b is a diagram illustrating a top view of dampening system 14 of FIG. 2a. In the embodiment illustrated in FIGS. 2a and 2b, latch slider 46 is disposed within display member 18 and slideably disposed between a plurality of ribs 64 to maintain slideable movement of latch slider 46 in a particular direction. In the embodiment illustrated in FIGS. 2a and 2b, biasing mechanism 62 comprises a first end 80 attachable to an end 82 of latch slider 46 and a second end 84 attachable to an anchor support 86. Latch slider 46 comprises framed opening 66 formed to surround and/or otherwise enclose latch stop 60 to enable movement of latch slider 46 relative to latch stop 60. Slot 66 comprises end walls 68 and 70 and parallel sidewalls 72 and 74 sized to receive latch stop 60. In the embodiment illustrated in FIGS. 2a and 2b, latch slider 46 is urged in the direction of arrow 54 to the locked position by biasing mechanism 62 such that end wall 70 engages dampener 58 and end wall 68 engages latch stop 60. In operation, latch stop 60 gradually decelerates and/or stops movement of latch slide 46 as it is urged to the locked position. According to a preferred embodiment, latch stop 60 comprises a high-energy absorbing foam or pad coupled to a rib 61 via an adhesive or other method of attachment; however, it should be understood that any type of material may be used that is capable of decelerating latch slider 46 and/or otherwise absorbing energy upon contact with latch slider 46. In the embodiment illustrated in FIGS. 2a and 2b, rib 61 is molded to display member 18 such that latch stop 60 maintains a fixed relationship relative to display member 18.

In the embodiment illustrated in FIGS. 2a and 2b, dampener 58 is mounted within and otherwise attached to display member 18 to receive and/or be at least partially disposed around biasing mechanism 62. In the embodiment illustrated in FIGS. 2a and 2b, biasing mechanism 62 is substantially disposed within dampener 58 to enable dampener 58 to absorb and/or otherwise reduce vibrations, and thus resulting noise, of biasing mechanism 62. In the embodiment illustrated in FIGS. 2a and 2b, biasing mechanism 62 is inserted through a dampener opening 76 and extends through the entire length of dampener 58. Dampener opening 76 is preferably sized slightly larger than the diameter of biasing mechanism 62 to enable unobstructed movement of biasing mechanism 62 within dampener 58.

According to some embodiments, biasing mechanism 62 comprises an extension spring 78 coupled to latch slider 46 to bias latch slider 46 to the locked position. It should be understood that biasing mechanism 62 may utilize other types of springs or biasing devices. For example, biasing mechanism 62 may be configured with a compression spring such that upon actuation of latch mechanism 12, biasing mechanism 62 is compressed, and thus biasing mechanism 62 applies a return compression force to latch slider 46. Accordingly, in operation, spring 78 urges latch slider 46 (and thus hooks 36 and 38) in the direction of arrow 54 to the locked position to position hooks 36 and 38 to engage base member 20 to secure electronic device 10 in the locked position. In some embodiments, when latch mechanism 12 is in the locked position, end wall 70 abuts dampener 58 and end wall 68 abuts and compresses latch stop 60.

FIG. 3a is a diagram illustrating a side view of dampening system 14 of FIG. 1 in an unlocked position and FIG. 3b is a top view illustrating the dampening system 14 of FIG. 3a. In the embodiment illustrated in FIGS. 3a and 3b, latch mechanism 12 is configured in the unlocked position such that latch slider 46 and thus hooks 36 and 38 are urged in the direction indicated by arrow 52 to align hooks 36 and 38 within openings 40 and 42, respectively. In operation, as latch mechanism 12 is positioned in the unlocked position by exerting a force on switch 56 in the direction of arrow 52 to overcome the biasing force generated by spring 78. When hooks 36 and 38 are aligned with openings 40 and 42, respectively, display member 18 may be lifted or otherwise rotated in the direction of arrow 88 (FIGS. 1 and 3b) relative to base member 20 to place electronic device 10 in the open position (FIG. 1). Upon release of switch 56, a return force generated by spring 78 acts on latch slider 46 to return latch mechanism 12 to a locked position (FIGS. 2a and 2b). As latch mechanism 12 returns to the locked position, latch slider 46 travels in the direction of arrow 54 such that end wall 68 engages latch stop 60 to decelerate the movement of latch slider 46. Movement and deceleration of latch slider 46 continues until end wall 70 contacts and/or otherwise abuts dampener 58, which prevents further movement of latch slider 46 and which may further decorate latch slider 46. Dampener 58 also absorbs and/or otherwise reduces vibrations of biasing mechanism 62. Accordingly, dampening system 14 reduces and or eliminates noise resulting from actuation of latch mechanism 12 by utilizing latch stop 60 to decelerate and otherwise absorb energy from latch slider 46 so as to minimize abrupt and/or potentially damaging contact with dampener 58. Further, dampener 58 absorbs and/or reduces vibrations generated by spring 78 to reduce or eliminate noise from latch mechanism 12.

Figure 4:
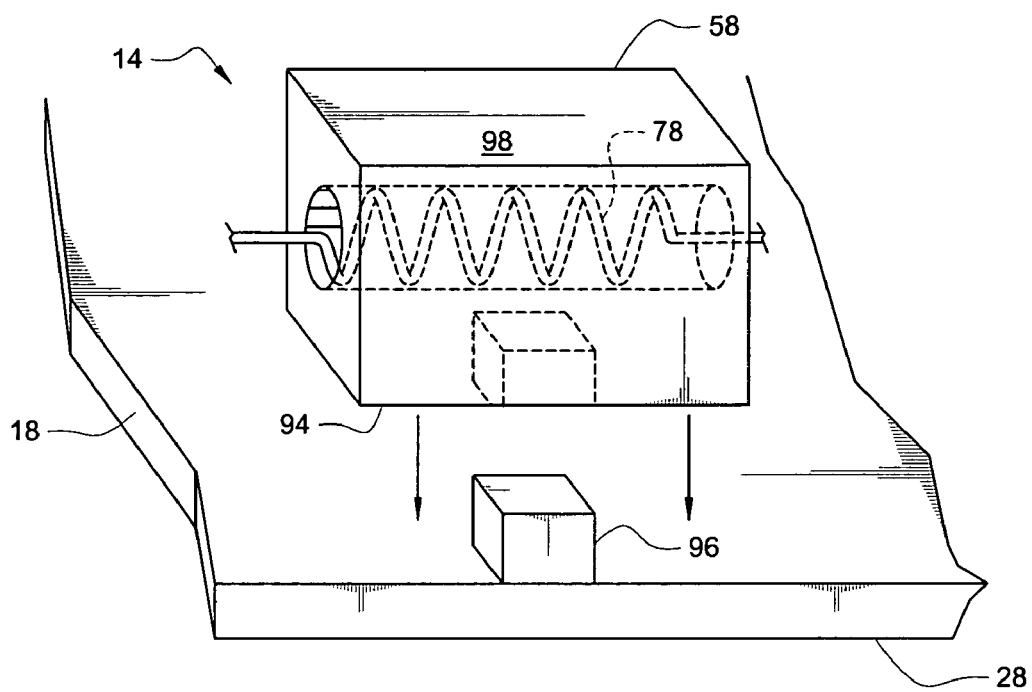
FIG. 4 is a perspective view illustrating an embodiment of a dampener of the dampening system of FIG. 1.

FIG. 4 is a diagram illustrating a portion of dampening system 14 of FIG. 1. In the embodiment illustrated in FIG. 4, dampener 58 is mountable to display member 18 by aligning a recessed area 92 disposed on a bottom surface 94 of spring dampener 58 with a corresponding protrusion 96 of display member 18 to secure dampener 58 in a fixed location on display member 18. In the embodiment illustrated in FIG. 4, protrusion 96 is disposed on the inner surface of front wall 28 so as to be insertable within recessed area 92; however, it should be understood that protrusion 96 may be otherwise positioned (e.g., on the inner side of rear wall 30 of display member 18 (FIG. 1) for engagement with a corresponding recessed area on a top surface 98 of dampener 58). In the embodiment illustrated in FIG. 4, protrusion 96 frictionally engages recessed area 92 to attach dampener 58 to display member 18; however, it should be understood that dampener 58 may be otherwise attached such as, for example, by an adhesive any other method of attachment.

Figure 5:
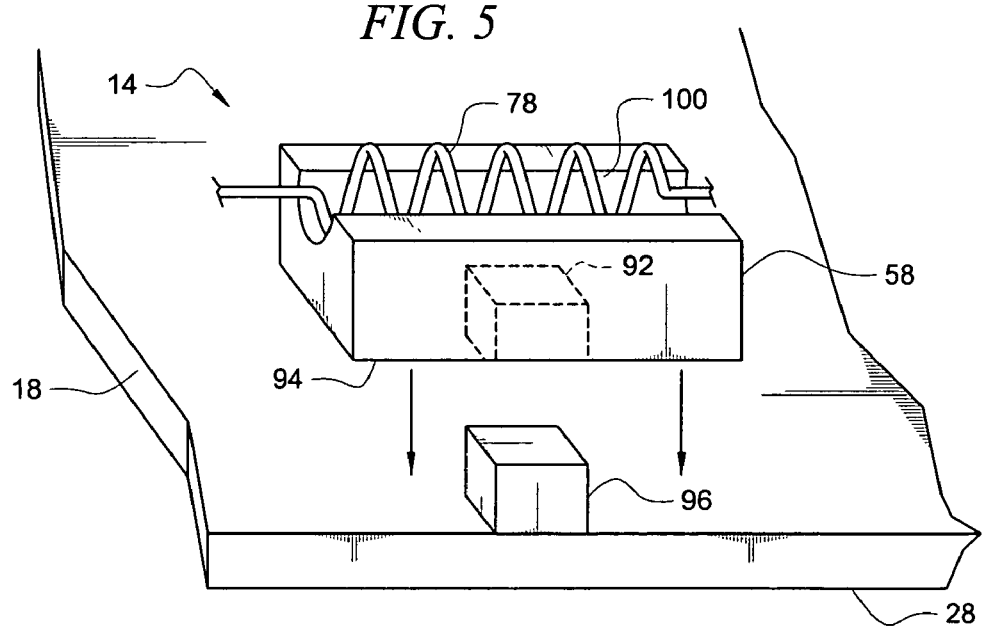
FIG. 5 is a perspective view illustrating another embodiment of a dampener.

FIG. 5 is a diagram illustrating another embodiment of dampener 58. In the embodiment illustrated in FIG. 5, dampener 58 comprises a groove 100 extending along the length of dampener 58 and configured to receive spring 78 to absorb and/or reduce vibrations generated by spring 78. In the embodiment illustrated in FIG. 5, dampener 58 is dispose around and is otherwise in contact with at least a portion of spring 78 to absorb and/or reduce vibrations generated by spring 78.

In the embodiments illustrated in FIGS. 1-6, dampening system 14 is illustrated as being used in connection with both a dampener 58 and a latch stop 60; however, it should be understood that dampening system 14 may be utilized with only a dampener 58 or only with a latch stop 60. Furthermore, it should be understood that additional number of dampeners and/or latch stops may be utilized. For example, dampening system 14 may comprise multiple latch stops and/or multiple dampener members or any combination thereof.

Thus, embodiments of dampening system 14 reduce and/or substantially eliminate unwanted and/or excessive noise resulting from actuation of latch mechanism 12 on electronic device 10. Embodiments provide a latch stop 60 to decelerate or stop movement of latch slider 46. Furthermore, dampening system 14 comprises a dampener 58 to absorb energy (e.g. vibrations) generated by biasing mechanism 62 to provide a quiet latch mechanism.

What is claimed is:
1. An electronic device comprising:
  a base;
  a display pivotally connected to the base;
  a latch mechanism slidably moved between a locked and unlocked position, the latch mechanism comprising a latch body having latch engagement members config- ured to engage a portion of the display on the locked position and a slot; an actuator to move the body and a biasing member connected to one end of the latch body to bias the body toward the locked position; and a dampening system that reduces acoustical noise generated in response to actuation of the latch mechanism moving to the locked position, the dampening system comprising a latch stop positioned within the slot of the latch body that gradually decelerates movement of the latch mechanism as the latch mechanism moves to the locked position, and a dampener disposed at least partially around the biasing member to absorb vibrations generated by the biasing member.

2. The electronic device of claim 1, wherein the latch stop is formed of a foam material.

3. The electronic device of claim 1, wherein the vibration absorbing dampener is a rubber material.

4. A method of manufacturing an electronic device, comprising:

providing a latch mechanism that moves between a locked and an unlocked position, the latch mechanism comprising a latch body having latch engagement members configured to engage a portion of the display on the locked position and a slot; an actuator to move the body and a biasing member connected to one end of the latch body to bias the body toward the locked position; and providing a dampening system that reduces acoustical noise generated in response to actuation of the latch mechanism moving to the locked position, the dampening system comprising a latch stop positioned within the slot of the latch body that gradually decelerates movement of the latch mechanism as the latch mechanism moves to the locked position, and a dampener disposed at least partially around the biasing member to absorb vibrations generated by the biasing member.

5. The method of claim 4, further comprising forming the latch stop of a foam material.

6. The method of claim 4, further comprising forming the vibration absorbing dampener of a rubber material.

7. An electronic device comprising:

a base;

a display rotatable connected to the base;

a latch mechanism that includes a latch slider moved between a locked and an unlocked position, a biasing mechanism that biases the latch slider to a locked position in which the display locks to the base, and an actuator to move the latch slider, the latch slider having latch engagement members configured to engage a portion of the display on the locked position and an opening; and a dampening mechanism connected to the latch mechanism, the dampening system comprising a latch stop positioned within the opening of the latch body and a dampener disposed at least partially around the biasing member, wherein the dampening mechanism decelerates movement of the latch mechanism when the latch slider moves to the locked position and reduces acoustical noise that is generated by the biasing member when the latch slider moves to the locked position.

8. The electronic device of claim 7, wherein the dampener is formed of a rubber material.

9. The electronic device of claim 7, wherein the latch stop is of a foam material.

* * * * *

UNITED STATES PATENT AND TRADEMARK OFFICE
CERTIFICATE OF CORRECTION

| | | |
|---|---|---|
| PATENT NO. | : 7,841,632 B2 | Page 1 of 1 |
| APPLICATION NO. | : 11/700203 | |
| DATED | : November 30, 2010 | |
| INVENTOR(S) | : Mark S. Tracy et al. | |

It is certified that error appears in the above-identified patent and that said Letters Patent is hereby corrected as shown below:

In column 4, line 65, in Claim 1, after "and" insert -- an --.

Signed and Sealed this
Twelfth Day of April, 2011

David J. Kappos
*Director of the United States Patent and Trademark Office*